United States Patent
Hsieh et al.

(10) Patent No.: US 8,253,348 B2
(45) Date of Patent: Aug. 28, 2012

(54) ILLUMINATION DEVICE CAPABLE OF ADJUSTING LIGHT BRIGHTNESS AND METHOD THEREOF

(75) Inventors: Kuan-Hong Hsieh, Taipei Hsien (TW); Shin-Hong Chung, Taipei Hsien (TW); Zhi-Guo Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 99 days.

(21) Appl. No.: 12/849,827

(22) Filed: Aug. 4, 2010

(65) Prior Publication Data
US 2011/0175534 A1 Jul. 21, 2011

(30) Foreign Application Priority Data
Jan. 18, 2010 (CN) .......................... 2010 1 0300403

(51) Int. Cl.
*G05F 1/00* (2006.01)
(52) U.S. Cl. ........................................ 315/291; 315/307
(58) Field of Classification Search .................. 315/291, 315/307
See application file for complete search history.

(56) References Cited

U.S. PATENT DOCUMENTS

| 6,762,563 | B2 * | 7/2004 | St-Germain et al. | 315/129 |
| 7,327,098 | B2 * | 2/2008 | Chen | 315/291 |
| 7,619,539 | B2 * | 11/2009 | Veskovic et al. | 340/4.3 |
| 2002/0047624 | A1 * | 4/2002 | Stam et al. | 315/291 |
| 2006/0006821 | A1 * | 1/2006 | Singer et al. | 315/312 |
| 2008/0129220 | A1 * | 6/2008 | Shteynberg et al. | 315/291 |

FOREIGN PATENT DOCUMENTS
CN 101621885 A 1/2010
* cited by examiner

*Primary Examiner* — Jason M Crawford
(74) *Attorney, Agent, or Firm* — Altis Law Group, Inc.

(57) ABSTRACT

An illumination device includes a light sensor, a light-emitting unit, a switch unit and a processing unit. The light sensor is configured for sensing ambient light intensity and providing results based on the sensed light intensity. The switch unit is configured for controlling the electrical connection between the light-emitting unit and a power unit. The processing unit includes a control module and a light adjusting module. The controlling module is configured for turning off the switch unit to cut off the electrical connection between the light-emitting unit and the power unit during the sensing of the light intensity. The light adjusting module is configured for adjusting the brightness of the light-emitting unit according to the results provided by the light sensor. A related method is also provided.

10 Claims, 2 Drawing Sheets

ILLUMINATION DEVICE CAPABLE OF ADJUSTING LIGHT BRIGHTNESS AND METHOD THEREOF

BACKGROUND

1. Technical Field

The present disclosure relates to illumination devices and, particularly, to an illumination device capable of self adjusting the brightness and a method thereof.

2. Description of the Related Art

Nowadays, illumination devices with light sensors are very popular. The light sensor can sense the ambient light intensity and the device can adjust the brightness of a light-emitting element according to the sensed ambient light intensity. However, the light provided by the light-emitting element may affect the sensed ambient light intensity, resulting that the device may not accurately adjust the brightness of the light-emitting element.

BRIEF DESCRIPTION OF THE DRAWINGS

The components in the drawings are not necessarily drawn to scale, the emphasis instead being placed upon clearly illustrating the principles of an illumination device capable of adjusting the brightness of itself and a method thereof. Moreover, in the drawings, like reference numerals designate corresponding parts throughout the several views.

DETAILED DESCRIPTION

Figure 1:
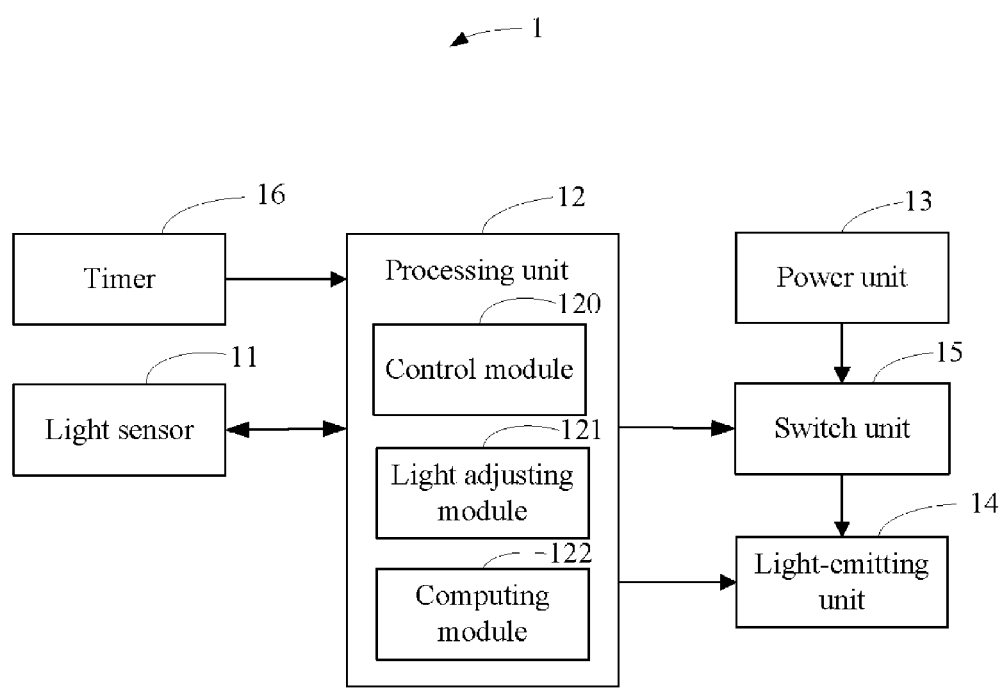
FIG. 1 is a block diagram of an illumination device capable of self adjusting the brightness, in accordance with an exemplary embodiment.

Referring to FIG. 1, an illumination device 1 includes a light sensor 11, a processing unit 12, a light-emitting unit 14, and a power unit 13. The light sensor 11 is configured for sensing the ambient light intensity and providing results to the processing unit 12 based on the sensed ambient light intensity. The light-emitting unit 14, such as a light-emitting diode (LED), is configured for providing light. The power unit 13 is configured for providing power to the illumination device 1.

The illumination device 1 further includes a switch unit 15. The switch unit 15 is configured for controlling the electrical connection between the light-emitting unit 14 and power unit 13. The illumination device 1 further includes a timer 16. The timer 16 has a default setting or a user-selected setting. The timer 16 may count-up or count-down.

The processing unit 12 includes a control module 120 and a light adjusting module 121. The control module 120 is configured for controlling the operation of the light sensor 11 and the switch unit 15. The control module 120 turns on the switch unit 15 for a first predetermined duration to power the illumination device 1 by employing the timer 16 to time the first predetermined duration, thus the light-emitting unit 14 lights within the first predetermined duration. During the first predetermined duration, the control module 120 controls the light sensor 11 to stop working, that is, it disables the light sensor 11. After the first predetermined duration elapses, the control module 120 turns off the switch unit 15 and enables the light sensor 11 to sense the ambient light intensity for a second predetermined duration by employing the timer 16 to time the second predetermined duration. Therefore, during the second predetermined duration, the light-emitting unit 14 is turned off and does not affect the results of the light sensor 11. In this embodiment, the control module 120 alternately turns on/off the switch unit 15 for the first predetermined duration and then the light sensor 11 is enabled for the second predetermined duration. In this embodiment, the first predetermined duration is longer than the second predetermined duration.

The first predetermined time duration may be prolonged to avoid unexpected occurrences, the unexpected occurrences can include an obstacle blocking out the ambient light suddenly for a very short time. In order to eliminate the negative effect to humans caused by turning off the light-emitting unit 14, the second predetermined duration can be preset to be less than the retention of vision.

The light adjusting module 121 is configured for adjusting the brightness of the light-emitting unit 14 according to the results provided by the light sensor 11 within the second time duration.

The processing unit 12 further includes a computing module 122. The computing module 122 is configured for computing the average value of the results. The light adjusting module 121 adjusts the brightness of the light-emitting unit 14 according to the average value.

Figure 2:
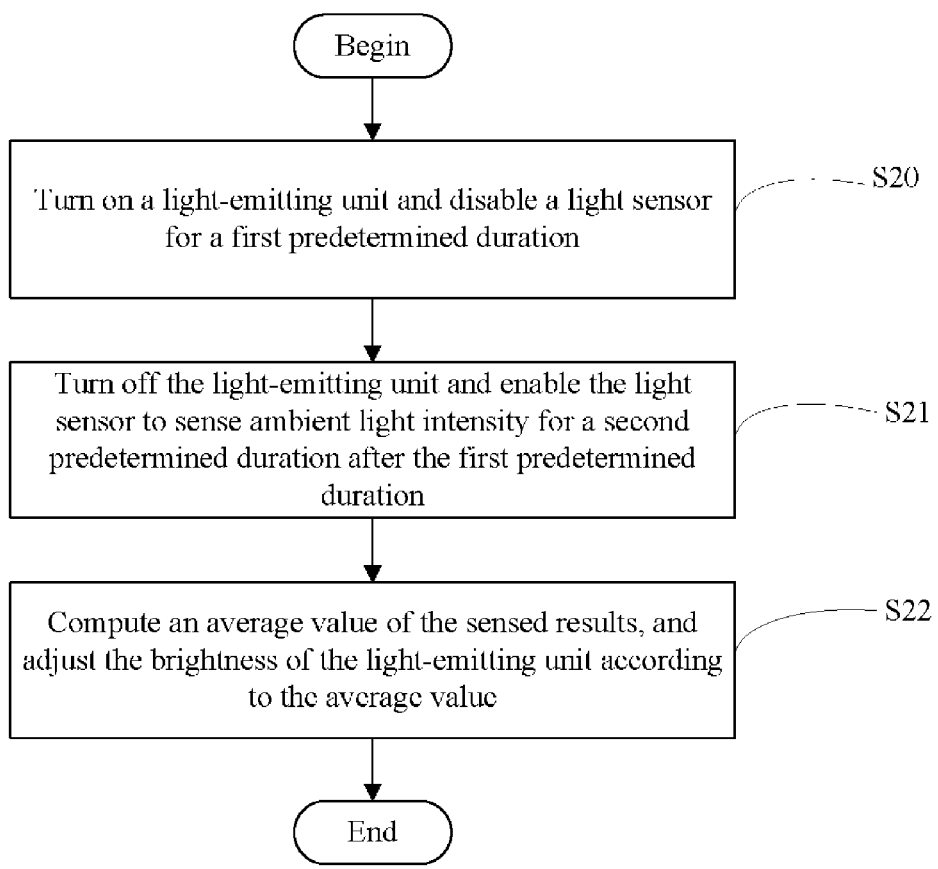
FIG. 2 is a flowchart of a method for adjusting light brightness, in accordance with an exemplary embodiment.

Referring to FIG. 2, a flowchart of a method for adjusting light brightness in accordance with an exemplary embodiment is shown.

In step S20, the control module 120 turns on the switch unit 15 for a first predetermined duration and disables the light sensor 11 during the first predetermined duration. In this embodiment, the control module 120 employs the timer 16 to time the first predetermined duration.

In step S21, after the first predetermined duration, the control module 120 turns off the switch unit 15 and enables the light sensor 11 to sense the ambient light intensity for a second predetermined duration by employing the timer 16 to time the second predetermined duration.

During the second predetermined duration, the light-emitting unit 14 is turned off to avoid affecting the sensed results.

In one embodiment, the first predetermined duration is longer than the second predetermined duration. The first predetermined duration may be prolonged to avoid unexpected occurrences, which can include an obstacle blocking out the ambient light suddenly for a very short time. In order to eliminate the negative effect to humans caused by turning off the light-emitting unit 13, the second predetermined duration can be preset to be less than the retention of vision.

In step S22, the light adjusting module 123 adjusts the brightness of the light-emitting unit 13 according to the sensed results. Specifically, the computing module 122 computes the average value of the sensed results, and the light adjusting module 121 adjusts the brightness of the light-emitting unit 13 according to the average value. After the second predetermined duration, the procedure returns to step S21.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An illumination device, comprising:
   a light sensor configured for sensing ambient light intensity and providing results based on the sensed ambient light intensity;
   a light-emitting unit configured for providing light;
   a switch unit configured for controlling electrical connection between the light-emitting unit and a power unit; and a processing unit comprising:
  a control module configured for turning off the switch unit to cut off the electrical connection between the light-emitting unit and the power unit during the light sensor sensing the light intensity, and turning on the switch unit to power the light-emitting unit by the power unit and disabling the light sensor during the lighting of the light-emitting unit; and
  a light adjusting module configured for adjusting the brightness of the light-emitting unit according to the results provided by the light sensor.

2. The illumination device as recited in claim 1, the processing unit further comprises a computing module configured for computing the average value of the results, and the light adjusting module is configured for adjusting the brightness of the light-emitting unit according to the average value.

3. The illumination device as recited in claim 1, wherein the control module is further configured for turning on the switch unit to power the light-emitting unit for a first predetermined duration and enabling the light sensor for a second predetermined duration alternately.

4. The illumination device as recited in claim 3, the first predetermined duration is longer than the second predetermined duration.

5. The illumination device as recited in claim 3, further comprising a timer configured for timing the first predetermined duration and the second predetermined duration.

6. A method for adjusting light brightness of an illumination device, the illumination device comprising a light-emitting unit and a light sensor, the method comprising:
  turning on the light-emitting unit and disabling the light sensor for a first predetermined time duration;
  turning off the light-emitting unit and enabling the light sensor to sense ambient light intensity to provide results based on the sensed light intensity for a second predetermined duration after the first predetermined duration;
  adjusting the brightness of the light-emitting unit according to the sensed results.

7. The method as recited in claim 6, further comprising:
  computing an average value of the sensed results; and
  controlling the brightness of the light-emitting unit according to the average value.

8. The method as recited in claim 6, the first predetermined duration is longer than the second predetermined duration.

9. An illumination device, comprising:
  a light-emitting unit; and
  a light sensor configured for sensing ambient light intensity and providing results based on the sensed light intensity; the sensed results being provided for adjusting the brightness of the light-emitting unit;
  wherein the light-emitting unit is enabled for a first predetermined duration and the light sensor is disabled during the first predetermined duration, the light-emitting unit is disabled for a second predetermined duration and the light sensor is enabled during the second predetermined duration.

10. The illumination device as recited in claim 9, wherein the first predetermined duration is longer than the second predetermined duration.

\* \* \* \* \*